2,947,781

Patented Aug. 2, 1960

2,947,781

REDUCTION PROCESS FOR PREPARING AROMATIC P-AMINO COMPOUNDS

Louis Spiegler, Woodbury, N.J., assignor to E. I. du Pont de Nemours and Company, Wilmington, Del., a corporation of Delaware No Drawing. Filed June 10, 1953, Ser. No. 360,815

9 Claims. (Cl. 260—518)

This invention relates to a new process for the manufacture of certain amine derivatives by the catalytic hydrogenation of the corresponding nitro compounds, and more particularly to the hydrogenation of p-nitrophenol and p-nitrobenzoic acid.

The aromatic amines of this type represent an important class of intermediates for dyes, anti-oxidants, developers, pharmaceuticals and many other products. The production of amines from the corresponding nitro compounds is well known in the art, and many methods for reducing the nitro compound have been proposed. One such method in the case of making p-aminophenol consists essentially of the reduction of p-nitrophenol with an alkali sulfhydrate or sulfide. This method is uneconomical because of the relatively high cost of the sulfide reducing agents and the difficulty involved in separating them from the final product.

Another method of reduction involves the use of iron filings and acetic acids, but the sludge formed also creates difficulty which makes the process somewhat undesirable. The iron may be replaced by tin, but the ultimate cost of the process is at least as high. Electrolytic reduction has also been proposed, but is uneconomical.

The reduction of nitrobenzene derivatives by catalytic reduction has also been proposed, and while several such processes are known, they are in general unsatisfactory, since they require expensive solvents such as ether, alcohol and the like.

Catalytic hydrogenation using a nickel catalyst has also been proposed, but extremely high pressures must be used which present a serious cost disadvantage as well as a high safety hazard. It is generally known in the art that the presence of water tends to impede the reduction of p-nitrophenol and similar nitro compounds and induces side reactions which would appear to render the process infeasible at atmospheric pressures.

Competition in the commercial preparation of amino compounds is high, and a successful process must produce a good yield of pure product in a simple and economical manner.

It is an object of this invention to prepare aminobenzene derivatives which avoid the disadvantages mentioned above. Another object is the preparation of such compounds in an aqueous medium at atmospheric pressure, whereby the cost of the process is reduced to a minimum. A still further object of the invention is the preparation of pure products in high yield with practically no unwanted by-products. Other objects will appear as the description of the invention proceeds.

These and other objects are accomplished by the catalytic hydrogenation of nitrobenzene derivatives defined more specifically hereinafter at 50° to 90° C. under atmospheric pressure using palladium or platinum or their oxides as a catalyst. The nitrobenzene derivatives which may be used as starting materials are p-nitrophenol and p-nitrobenzoic acid.

When these compounds are subject to catalytic hydrogenation the nitro group is reduced to the corresponding amine without interference from the other groups attached to the nucleus. Examples of such products are p-aminophenol, p-aminobenzoic acid and their corresponding homologues.

The process is carried out in a very simple manner using conventional equipment which may consist of a jacketed reaction vessel fitted with a thermometer or thermocouple, a manometer and a stirrer. In carrying out the invention the reactor is charged with water, nitro compound and the catalyst without the addition of an acid other than the reactant where X is of an acid character. It is then purged with nitrogen which is subsequently displaced with hydrogen and heated to about 85° C. while being agitated. Hydrogen gas is then introduced until absorption ceases, at which time reduction is complete. The reaction mass is then filtered hot from the catalyst and the clarified liquors are cooled, whereupon the amino compound crystallizes out in good yield.

The nitro compound and hydrogen may be of technical grade, but should be free of catalyst poisons such as sulfur, copper, and their compounds.

The catalyst is platinum or palladium or their oxides and may be supported on charcoal or other porous substrates such as kieselguhr, barium sulfate, carbon and the like. The catalyst concentration may vary from 0.025% to 0.1% (exclusive of support) based on the nitro compound. The rate of reduction depends upon the concentration used, but when less than 0.025% of catalyst is present the rate of reduction is too low to be practical, and concentrations above 0.1% do not result in a warranted increase in conversion. If the catalyst should become poisoned during a run more may be added.

The process can be operated with the partial pressure of hydrogen between 200 and 700 mm. of mercury. The partial pressure of hydrogen in the reaction vessel is equal to the total pressure in the vessel less the pressure of the water vapor over the solution at the existing temperature. Below 200 mm. partial pressure of hydrogen, the reaction is too slow to be economically valuable, and when operating above 700 mm. no advantage is observed. The preferred pressure range is from 235 to 700 mm. of mercury partial pressure of hydrogen.

The temperature may vary up to 95° C., although below 50° C. the reaction rate is too low for practical purposes. At temperatures above 95° C. the partial pressure of hydrogen becomes comparatively low unless super atmospheric pressures are used, which are not preferred in the present invention. The best temperature for operation is between 60° and 90° C.

It has also been found that the reduction proceeds much more readily if the charge is agitated during reduction. Stirring speeds of 500 to 800 r.p.m. are preferred.

After reduction is complete, the catalyst is filtered from the aqueous reaction mass containing the amino compound, which may be separated from the filtrate by simple cooling and crystallization. The crystals are filtered from the mother liquor, and the latter may be returned in the customary practice to a subsequent charge for another reduction cycle.

When the mother liquor is re-used in a recycle process, it is necessary to avoid oxidation by exposure to air by maintaining an atmosphere of hydrogen, nitrogen or carbon dioxide around the charge while it is being processed.

The process may be conducted as a batch or continuous process. In the latter the aqueous suspension of the p-nitro compound and catalyst may be fed into a reactor through which hydrogen is flowing. The hydrogen emanating from the reactor can be collected and recycled. The reduction liquor is then continuously withdrawn through a clarifying filter to remove the catalyst which may then be returned to the reaction vessel. The filtrate is treated as described above and the mother liquor returned to the reaction vessel with more nitro compound. By operating in this manner little or no loss of product occurs.

The amount of water used in the system is not critical, but there should be enough present to form a rather thin slurry which may be readily stirred at the operating temperature. On the other hand, too large a volume of water results in unnecessary bulk in the reaction vessel.

The following examples are given by way of illustration, but no limitation is placed thereon, since they may be altered by substituting equivalent weights of any nitro compound falling within the limits and formula mentioned above; and while the process has been illustrated using a palladium and platinum catalyst, it is to be understood that their oxides may be used with equally good results.

EXAMPLE I

A 5-liter balloon flask having four vertical creases which serve as baffles is fitted with an agitator whose blade is a segment of glass 1½″ deep x 5⁷⁄₁₆″ wide x ⅛″ thick, cut from a circular glass plate. The stirrer shaft passes through an Ace "Truebore" water-cooled bearing. The flask is also provided with a thermometer, manometer, jacket, and gas inlet and outlet.

The flask is charged with the following:

| | Parts by weight |
|---|---|
| Water | 1000 |
| 100% p-nitrophenol (0.496 mol) | 69 |
| Platinum supported on 2 parts of carbon | 0.02 |

The flask and contents are first flushed or swept with nitrogen to remove air. The nitrogen atmosphere is then displaced with hydrogen and the agitator is revolved at 750 to 780 r.p.m. while the flask is heated to 83° to 85° C. Hydrogen gas is added at such a rate (0.43 cu. ft./hr.) that the pressure in the flask remains essentially constant. The pH of the reaction mass is about 5.5 to 6. The reduction is complete when no further hydrogen absorption is noted. Time required to absorb 1.5 mols of $H_2$ is 224 minutes. The reduction mass is heated to about 98° C. and is filtered hot under $N_2$ pressure to recover catalyst. The clarified liquors are then cooled (in a nitrogen atmosphere to 10° to 12° C.). The colorless crystals of p-aminophenol so formed are collected by filtration and dried at 60° C. in a current of nitrogen. 47 parts of pure, white p-aminophenol M.P. 188.5–189.3° C. are so obtained. The filtrate, 948 parts, contains 5 to 6 parts of p-aminophenol. If exposure to air oxidation is avoided, this mother liquor can be used in place of water for reduction of more p-nitrophenol.

EXAMPLE II

A mixture of the following:

| | Parts by weight |
|---|---|
| Water | 1000 |
| p-Nitrophenol | 69 |
| Palladium metal supported on 2 parts of carbon | 0.06 | is reduced at 85° to 86° C. while agitating at 780 r.p.m. as described in Example I. Hydrogen is absorbed at the rate of 1.2 cu. ft./hr., and the reaction is complete in 60 to 65 minutes. The hot colorless filtrate is spray-dried in a conventional manner with inlet nitrogen drying gas at 700±10° F. and a chamber temperature of 200° to 215° F. to give good quality p-aminophenol M.P. 188.3° C. as a colorless powder.

EXAMPLE III

When Example II is repeated, but agitation reduced to 500 r.p.m., reduction is complete in 90 to 100 minutes. The hydrogen absorption rate is about 0.85 cu. ft./hr.

When the reduction is carried out as in Example II, but at 50° C. or at 90° C., the rate of reduction is less than 0.80 cu. ft./hr.

EXAMPLE IV

A flask as described in Example I is charged with the following:

| | Parts by weight |
|---|---|
| Water | 1000 |
| p-Nitrobenzoic acid (0.48 mol) | 80 |
| Platinum supported on 4 parts of carbon | 0.04 |

The flask and contents are first flushed or swept with nitrogen to remove air. The nitrogen is then displaced with hydrogen and the agitation is started at 780 to 800 r.p.m. while heating to about 85° C. Hydrogen gas is added over the surface at such a rate (0.70 cu. ft./hr.) that the total pressure in the flask remains at atmospheric and essentially constant. The reduction is complete when no further hydrogen absorption is noted (1.5 mols of $H_2$ are absorbed in 140 minutes). The pH of the reaction mass is about 4.8 to 5.0.

The p-nitrobenzoic acid suspension dissolves as the reduction proceeds. The mass is filtered hot from catalyst. The clarified liquor on cooling precipitates colorless crystals of p-aminobenzoic acid in 85% yield and 98.2% purity as determined by diazotization with nitrite. The product dried at 65° C. analyzed as follows:

*Analysis of p-aminobenzoic acid*

| | Found | Recorded or Calc. for $C_7H_7O_2N$ |
|---|---|---|
| Melting Range ° C | 185–186.5 (decomp.) | 187 |
| C percent | 60.7; 61.1; 61.8 | 61:3 |
| H do | 5.28; 5.11; 5.19 | 5.1 |
| N do | 10.1; 10.0 | 10.2 |
| Acid No | 416.3; 417.4 | 409 |
| Percent Purity by Nitrite Absorp. (M.W.=137) | 98.2 | 100.0 |

EXAMPLE V

A slurry of:

| | Parts by weight |
|---|---|
| Water | 1000 |
| p-Nitrobenzoic acid | 81 |
| Palladium supported on 2 parts of carbon | 0.06 | is reduced at 85° C. while agitating at 500 r.p.m. as described in Example IV. Hydrogen is absorbed at a rate of 1.0 to 1.1 cu. ft./hr. and the reaction is complete in 75 to 90 minutes. The hot colorless filtrate from catalyst is spray dried in conventional manner with inlet nitrogen drying gas at 700±10° F. and chamber temperature at 200° to 215° F. to give good quality p-aminobenzoic acid of 99.9% purity by amino titre.

EXAMPLE VI

Reduction as in Example V, but using 0.03 part of palladium supported on 1.0 part of carbon absorbs 0.32 to 0.40 cu. ft./hr. and is completed in 300 to 315 minutes. The p-aminobenzoic acid, isolated by filtration under nitrogen pressure and dried at 60° to 70° C. in a current of nitrogen, is a colorless product which melts at 184.8–185° C. (with decomposition) and which analyzes 99.9% in purity.

EXAMPLE VII

*Effect of catalyst concentration on reduction rate*

When the process is carried out as described in Example V, but the concentration of palladium catalyst varied, the reduction rates shown in the following table are obtained:

Temp.=85° C.
Conc. of p-nitrobenzoic acid=0.5 mol/1000 cc.
Agitator speed=500 r.p.m.

| Catalyst Concentration | | Reduction Rate, Cu. ft. $H_2$ absorbed/Hr. |
|---|---|---|
| Parts/100% Pd/1,000 cc. | Percent Pd (based on PNBA) | |
| 0.015 | .018 | 0.24 |
| 0.030 | .036 | 0.38 |
| 0.060 | .072 | 0.97 |
| 0.120 | .144 | 1.02 |

EXAMPLE VIII

*Effect of agitator speed on reduction rate*

Following the details of Example V, 83.5 parts of p-nitrobenzoic acid in 1000 parts of water is reduced with hydrogen using 0.072% Pd catalyst. When the agitator speed is varied, the following reduction rates are obtained:

| Agitator speed, r.p.m.: | Reduction rate, cu. ft. $H_2$ absorbed/hr. |
|---|---|
| 200 | 0.14 |
| 300 | 0.33 |
| 500 | 0.88 |
| 800 | 1.00 |

EXAMPLE IX

*Effect of added methanol on reduction rate*

As in Example V, 83.5 parts of p-nitrobenzoic acid are reduced with hydrogen using 0.144% Pd supported on charcoal as catalyst. The table below indicates the effect of replacing the aqueous system used in Example V with a 7% aqueous methanol (by weight) solution.

| Temp. | Reaction Medium | Reduction Rate, Cu. ft. $H_2$ absorbed/Hr. |
|---|---|---|
| 85° C | 100% $H_2O$ | 1.10 |
| 60° C | 93 parts $H_2O$ 7 parts $CH_3OH$ | 1.52 |

EXAMPLE X

*Recycle operation*

Reduction as in the previous examples, of a slurry of:

| | Parts by weight |
|---|---|
| Water | 1000 |
| p-Nitrobenzoic acid (0.495 mol) | 82.8 |
| Methanol | 89 |
| Palladium supported on 4 parts of carbon | 0.12 | at 55° to 60° C. and 480 to 500 r.p.m. is effected in approximately 50 to 60 minutes. A portion (85% to 90%) of the filtrate obtained after isolating the p-aminobenzoic acid by crystallization is re-used in the reduction stage with 85% to 90% of the recovered catalyst and 90 parts of fresh water and 8.9 parts of fresh methanol, and 0.015 part of fresh palladium on 0.5 part carbon. After isolation of p-aminobenzoic acid, the catalyst and filtrate are again re-used in reduction as described above. No appreciable change in reduction rate is observed in the recycling or re-use operations.

Comparative results and yields for the recycle reductions are shown below:

| | p-Aminobenzoic Acid | | Amino Titre, Percent Purity |
|---|---|---|---|
| | parts | Mols | |
| 1st Reduction | 58.5 | 0.427 | 100 |
| 1st Recycle | 66.2 | 0.484 | 100 |
| 2nd Recycle | 67.1 | 0.490 | 100 |

It will be apparent that many widely different embodiments of this invention may be made without departing from the spirit and scope thereof, and therefore it is not intended to be limited except as indicated in the appended claims.

I claim:

1. The process of preparing an amino compound taken from the group consisting of p-aminophenol and p-aminobenzoic acid by catalytic hydrogenation of the corresponding starting nitro compound which comprises adding hydrogen gas to a suspension consisting of the nitro compound to be reduced, water, and catalyst, at atmospheric pressure and at a temperature within the range of 50–95° C., said catalyst being selected from the group consisting of platinum and palladium and their oxides, and, said catalyst being present in said suspension at a concentration of at least 0.025% based on the weight of said starting nitro compound.

2. The process of claim 1 in which the partial pressure of hydrogen is between 200 and 700 mm. of mercury.

3. The process of claim 1 wherein said reduction is carried out under conditions of agitation.

4. The process of preparing p-aminophenol by catalytic hydrogenation of p-nitrophenol which comprises adding hydrogen gas to a suspension consisting of p-nitrophenol, water, and catalyst, at atmospheric pressure and at a temperature within the range of 50–95° C., said catalyst being selected from the group consisting of platinum and palladium and their oxides, and, said catalyst being present in said suspension at a concentration of at least 0.025% based on the weight of said starting p-nitrophenol.

5. The process of claim 4 in which the partial pressure of hydrogen is between 200 and 700 mm. of mercury.

6. The process of claim 4 wherein said reduction is carried out under conditions of agitation.

7. The process of preparing p-aminobenzoic acid by catalytic hydrogenation of p-nitrobenzoic acid which comprises adding hydrogen gas to a suspension consisting of p-nitrobenzoic acid, water, and catalyst, at atmospheric pressure and at a temperature within the range of 50–95° C., said catalyst being selected from the group consisting of platinum and palladium and their oxides, and, said catalyst being present in said suspension at a concentration of at least 0.025% based on the weight of said starting p-nitrobenzoic acid.

8. The process of claim 7 in which the partial pressure of hydrogen is between 200 and 700 mm. of mercury.

9. The process of claim 7 wherein said reduction is carried out under conditions of agitation.

References Cited in the file of this patent

UNITED STATES PATENTS

| 2,035,292 | Bertsch | Mar. 24, 1936 |
| 2,198,249 | Henke et al. | Apr. 23, 1940 |
| 2,570,297 | Weisblat et al. | Oct. 9, 1951 |
| 2,619,503 | Benner et al. | Nov. 25, 1952 |

OTHER REFERENCES

Degering: Organic Nitrogen Compounds, pages 295–296 (1945).